(12) United States Patent
Flinck

(10) Patent No.: US 8,843,588 B2
(45) Date of Patent: Sep. 23, 2014

(54) METHODS, APPARATUSES, RELATED COMPUTER PROGRAM PRODUCT AND DATA STRUCTURE FOR DISTRIBUTED STORAGE OF SERVICE PROVISION-RELATED INFORMATION

(75) Inventor: Hannu Flinck, Helsinki (FI)

(73) Assignee: Nokia Siemens Networks OY, Espoo (FI)

( * ) Notice: Subject to any disclaimer, the term of this patent is extended or adjusted under 35 U.S.C. 154(b) by 162 days.

(21) Appl. No.: 13/383,333

(22) PCT Filed: Jul. 10, 2009

(86) PCT No.: PCT/EP2009/058788
§ 371 (c)(1),
(2), (4) Date: Jan. 10, 2012

(87) PCT Pub. No.: WO2011/003456
PCT Pub. Date: Jan. 13, 2011

(65) Prior Publication Data
US 2012/0131142 A1 May 24, 2012

(51) Int. Cl.
*G06F 15/16* (2006.01)
*H04L 29/08* (2006.01)
*G06F 9/50* (2006.01)

(52) U.S. Cl.
CPC ............ *G06F 9/5016* (2013.01); *H04L 67/289* (2013.01); *H04L 67/2852* (2013.01); *H04L 67/2895* (2013.01)
USPC ....................................................... 709/217

(58) Field of Classification Search
USPC .................. 709/201–203, 217–219, 223–229; 455/432.3; 711/100–111
See application file for complete search history.

(56) References Cited

U.S. PATENT DOCUMENTS

| | | | |
|---|---|---|---|
| 2006/0056351 A1* | 3/2006 | Wall | 370/331 |
| 2007/0207805 A1* | 9/2007 | Pallares Lopez et al. | 455/436 |
| 2008/0159228 A1* | 7/2008 | Kufner | 370/331 |
| 2010/0188990 A1* | 7/2010 | Raleigh | 370/252 |
| 2010/0189017 A1* | 7/2010 | Mas Rosique et al. | 370/259 |
| 2010/0191886 A1* | 7/2010 | Saarikivi et al. | 710/264 |
| 2010/0313024 A1* | 12/2010 | Weniger et al. | 713/170 |

OTHER PUBLICATIONS

Menth, et al: "Future Internet Routing: Motivation and Design Issues", IT -Information Technology R. Oldenburg Verlag GmbH, XP-002569799, Apr. 6, 2008, pp. 358-366, Germany.
Farinacci, et al: "Locator/ID Separation Protocol (LISP)", Internet Draft, XP-002569797, Aug. 13, 2007, pp. 1-40.
Iannone, et al: "On the Cost Caching Locator/ID Mappings", Internet Draft, XP-002569795, Dec. 13, 2007, pp. 1-12, Belgium.

* cited by examiner

*Primary Examiner* — Chirag R Patel
(74) *Attorney, Agent, or Firm* — Laurence A. Greenberg; Werner H. Stemer; Ralph E. Locher

(57) ABSTRACT

A method and related apparatus determine, at a serving entity, whether a memory resource of the serving entity is insufficient for storing service provision-related information required for service provision from the serving entity to a served entity. Then the serving entity transmits, after the determination, the service provision-related information to the served entity based on a result of the determination; and a method (and related apparatus) provides for receiving, at a served entity, the service provision-related information, holding the received service provision-related information, and transmitting, from the served entity to the serving entity, the held service provision-related information.

28 Claims, 4 Drawing Sheets

METHODS, APPARATUSES, RELATED COMPUTER PROGRAM PRODUCT AND DATA STRUCTURE FOR DISTRIBUTED STORAGE OF SERVICE PROVISION-RELATED INFORMATION

FIELD OF THE INVENTION

An example of the present invention relates to distributed storage of service provision-related information. More specifically, the example of the present invention relates to methods, apparatuses, a related computer program product and a data structure for distributed storage of service provision-related information. The example of the present invention may be applicable e.g. to internet protocol (IP) routing, separation of end user identifier and routing locator address, routing scalability, address mapping, address translation, gateways, mobility, routing within different scopes and state-full network address translation (NAT).

BACKGROUND

The proliferation of IP addresses and growing routing table sizes is addressed, among a variety of other approaches, by separating address spaces of end systems and network core. End point addresses in end system address spaces are called end point identifiers (EID) or edge addresses, core addresses in the core network address space are called routable addresses, routing locators (RLOC) or transit addresses. Transitions between address spaces may be handled by tunneling (e.g. encapsulation) or address translation. Both mechanisms may require related mapping tables in the transition gateway devices.

Internet routing and a related addressing architecture may face challenges in scalability, multi-homing, and interdomain traffic engineering. One issue may reside in overloaded semantics of the IP addresses that represent both the identity of the hosts as well as the location of the hosts. However, overloaded addressing semantics has contributed to the rigidity of the Internet architecture by coupling application entities, transport and network protocols and the routing together. This rigidity shows up in a number of operational matters, e.g. renumbering of sites or even hosts is difficult, and may be considered something to be avoided by the network administrators; the amount of state information to be stored in the routing system grows faster than the number of hosts, thus causing routing scalability problems.

In consideration of the above, according to the example of the present invention, methods, apparatuses, a related computer program product and a data structure for distributed storage of service provision-related information are provided.

In this connection, the example of the present invention enables one or more of the following:

Enabling reuse and caching of the mappings, thus reducing the mapping resolution signaling;
Enabling also the first packet of a new connection already having mapping information in the cache of the local gateway to avoid resolution delay experienced by the earlier session that had to proceed through the resolution process;
Avoiding costly signaling, as the mapping information may also include additional information beyond the address mappings such as priority and weight;
Reusability of mapping information that was earlier obtained but purged later on from the cache, but is now requested for the new connection;
Avoiding a penalty of resolving the mapping information even if it was cleaned out from the current cache entries;
Avoiding consumption of local access link capacity due to state transfer between the host and the gateway;
Coping with a need being that hosts may communicate frequently with a certain set of host by making this set of frequently contacted hosts available beforehand to the serving entity;
Enabling the serving entity to resolve the mappings before the mappings are actually needed, thus improving the end user experience e.g. in case of mobile served entities that are changing their serving entity;
Enabling an independent software/firmware upgrade of the serving entity and/or the served entity, e.g. enabling the serving entity to cope with a legacy served entity.

BRIEF DESCRIPTION OF THE DRAWINGS

The example of the present invention is described herein below with reference to the accompanying drawings, in which.

DETAILED DESCRIPTION OF THE EXAMPLE OF THE PRESENT INVENTION

The example of the present invention is described herein below by way of example with reference to the accompanying drawings.

It is to be noted that for this description, the terms "gateway entity; client entity, a user equipment, a host entity and mobile host entity; mapping information and/or definition of a mapping between an endpoint identifier and a locator; roaming operation and/or a handover operation; and mapping from end point identifier to routing locator" are examples for "serving entity; served entity; service provision-related information; mobility event; and resolving", respectively, without restricting the latter-named terms to the special technical or implementation details imposed to the first-named terms.

Figure 1:
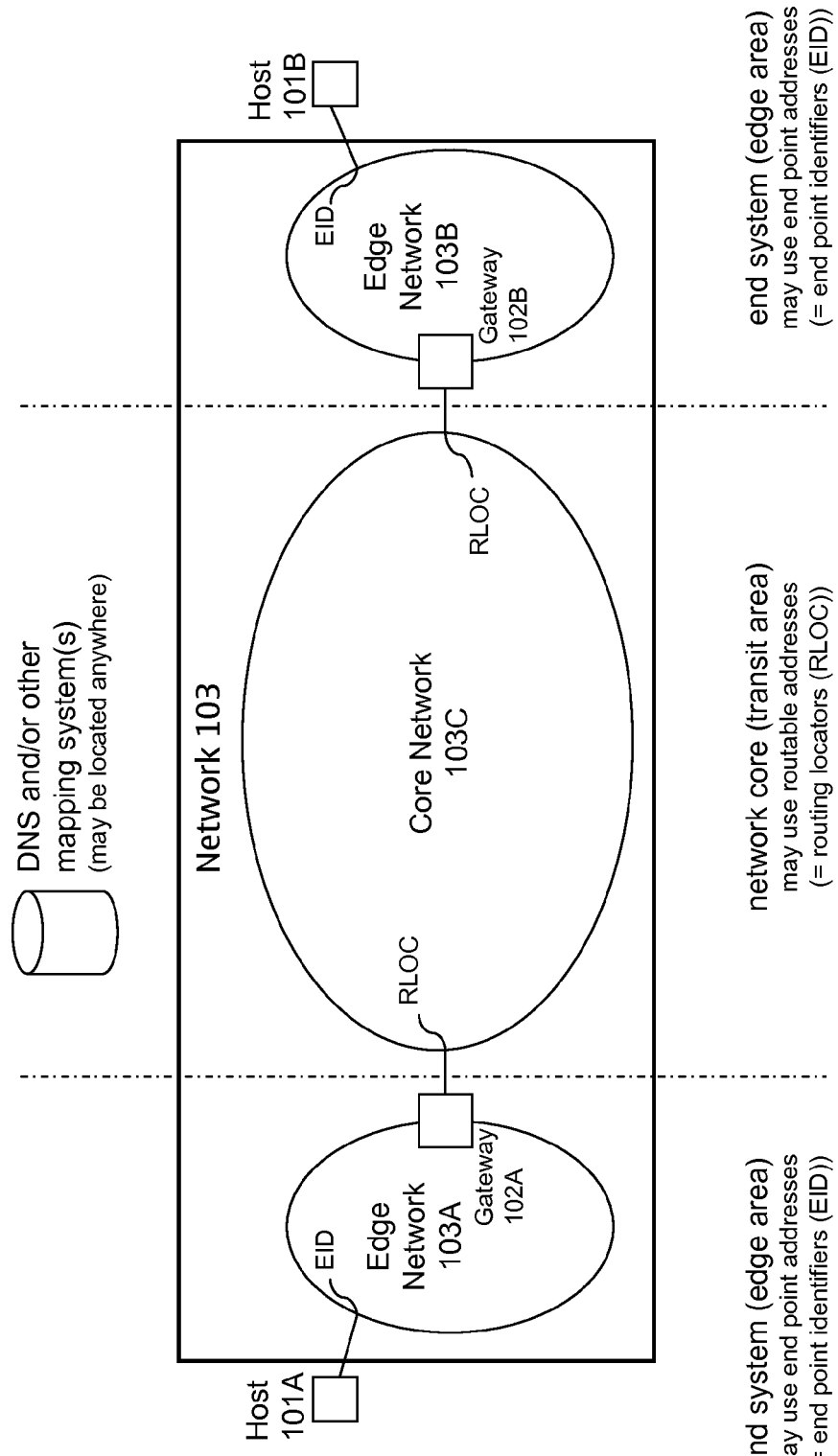
FIG. 1 shows an inter-networking configuration depicting a use case to which the example of the present invention can be applied.

FIG. 1 shows the inter-networking configuration depicting the use case to which the example of the present invention can be applied. As shown in FIG. 1, a communication network 100 may comprise a first host (or served entity) 101A, a network 103 and a second host (or served entity) 101B. In turn, the network 103 may comprise a first edge network 103A, a second edge network 103B and a core network 103C. Further, a first gateway (or served entity) 102A may be situated between the first edge network 103A and the core network 103C, and a second gateway (or serving entity) 102B may be situated between the core network 103C and the second edge network 103B.

As shown in FIG. 1, an address space used in the edge network 103A or edge network 103B of the network 103 may be separated from the address space used in the core network 103C of the network 103. The edge networks 103A, 103B and the attached hosts 101A, 101B may thus have provider independent addresses (e.g. EIDs), whereas the core address space used for routing between different network domains can be provider aggregatable using routing locators (RLOCs). The gateway 102A, 102B at the border of the two address spaces may be present to map or translate the two address spaces. An address of the edge address space may be referred to as end point identifier (EID), and an address used for routing in the global internet may be referred to as a routing locator (RLOC).

When the first host 101A, which may reside in the first edge network 103A with an address allocated from the edge address space of this first edge network 103A, intends to transmit a packet destined to the second host 101B at the second edge network 103B reachable via the core network 103C, the first host 101A would need to learn the destination edge address (i.e. the EID) of the second host 101B e.g. through a naming service such as the domain name server (DNS) system. The name resolution system may return the address of the second host 101B in the edge address space of the second (e.g. destination) edge network 103B. After the name resolution, the first host 101A may transmit a packet with the resolved destination edge address (i.e. the destination EID of the second host 101B) to the first gateway 102A, e.g. the one connecting the first edge network 103A with the core network 103C.

The first gateway 102A then may need to identify the at least one second (destination) gateway 102B (e.g. the egress tunnel router) connecting, to the core network 103C, the second edge network 103B of the second host 101B by resolving the mapping of the destination edge address (EID) of the second host 101B to the corresponding routing locator (RLOC) of that second gateway 102B using e.g. a corresponding mapping system.

Once the mapping between the destination edge address and the routable address (also referred to as "routing locator" or "transit address") of the second gateway 102B is known, the first gateway 102A may transmit the packet (and e.g. all consecutive ones of the same communication session) over the core network 103C to the second gateway 102B either using e.g. a tunneling mechanism or using an address translation method.

The gateway device 102A, 102B may need to maintain the mapping between the two address spaces at least for the duration of the communication session. Many times, the mappings between an EID of the second host 101B and the RLOC of its corresponding gateway 102B may be shared with other hosts and sessions of the first edge network 103A trying to reach the same second host 101B.

In routing scalability solutions, where the edge address space is separated from the globally routable locator address space as described above, the gateway device(s) 102A, 102B at the border between the two address spaces may need to maintain mappings between a destination end point identifier and the corresponding routing locator. The gateway device 102A, 102B may be a translator-type device, a tunneling end point device similar to an ingress tunnel router (ITR) or some similar device capable of mapping the two address spaces. A behavior of a mapping gateway is to resolve a destination end point identifier to a (set of) routing locator(s) and cache the mapping. This resolved mapping of an end point identifier to a routing locator set may be performed per end point identifier. The routing locator may identify a gateway that has information on how to reach a remote node with a particular end point identifier.

Figure 2:
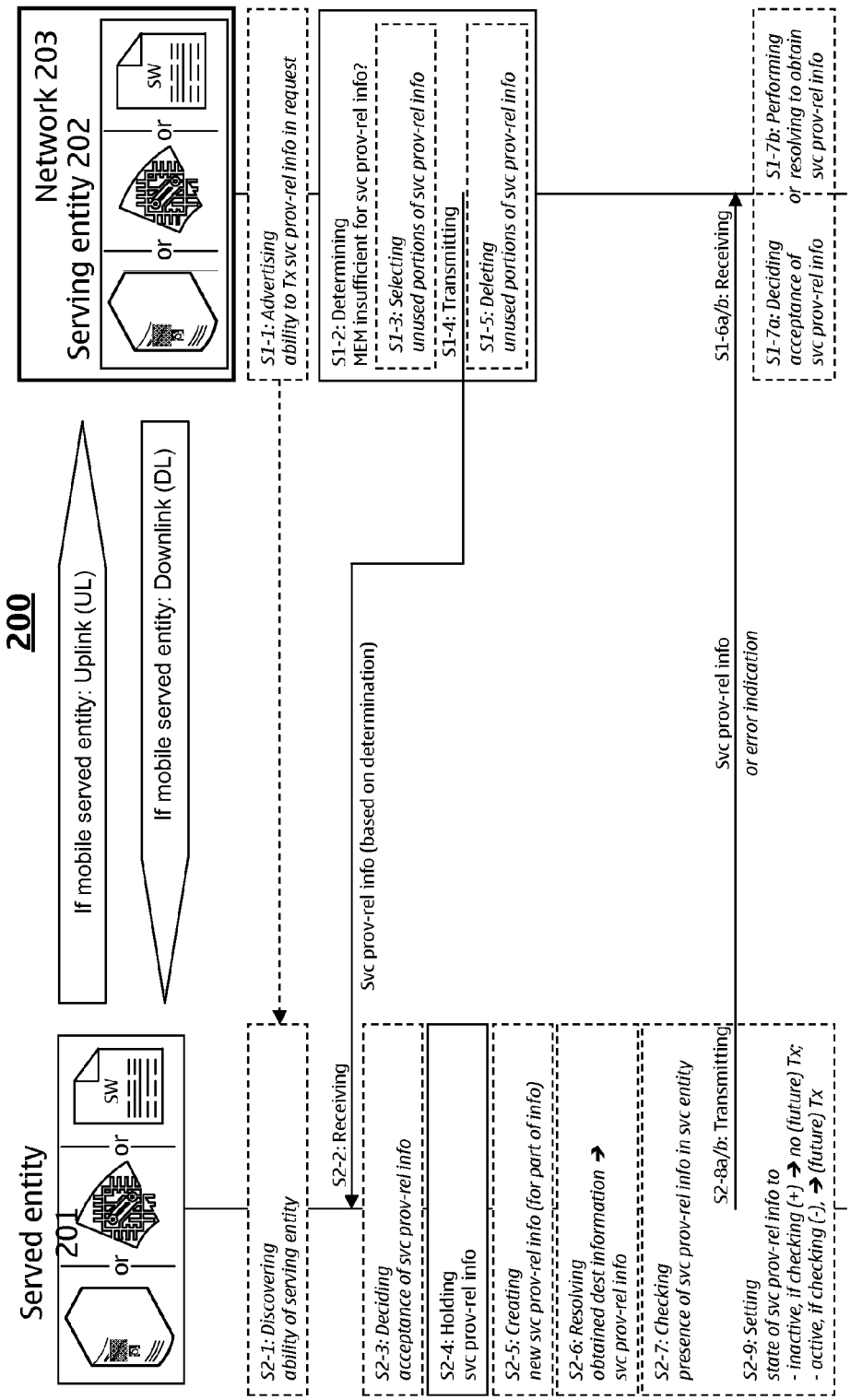
FIG. 2 shows methods for distributed storage of service provision-related information according to an example of the present invention.

FIG. 2 shows the methods for distributed storage of service provision-related information according to the example of the present invention. Signaling between elements is indicated in horizontal direction, while time aspects between signaling may be reflected in the vertical arrangement of the signaling sequence as well as in the sequence numbers. It is to be noted that the time aspects indicated in FIG. 2 do not necessarily restrict any one of the method steps shown to the step sequence outlined. This applies in particular to method steps that are functionally disjunctive with each other. Within FIG. 2, for ease of description, means or portions which may provide main functionalities are depicted with solid functional blocks or arrows and/or a normal font, while means or portions which may provide optional functions are depicted with dashed functional blocks or arrows and/or an italic font.

As shown in FIG. 2, a communication system 200 may comprise a served entity 201 (e.g. (mobile) host, UE etc.) and a network 203. In turn, the network 203 may further comprise a serving entity 202 (e.g. gateway etc.).

Further, as shown in FIG. 2, in an optional preparatory step S1-1, e.g. the serving entity 202 may perform advertising, e.g. to the served entity 201, a capability of transmitting service provision-related information required for service provision from the serving entity to a served entity. In turn, in an optional step S2-1, e.g. the served entity 201 may perform discovering the ability that the serving entity is capable of transmitting the service provision-related information to the served entity.

In step S1-2, e.g. the serving entity 202 may perform determining if a memory resource of the serving entity is insufficient for storing the service provision-related information.

Further, in an optional step S1-3, e.g. the serving entity 202 may perform, in the determining, selecting of unused portions of the service provision-related information.

Then, in step S1-4, e.g. the serving entity 202 may perform transmitting, after the determining in step S1-2, the service provision-related information to the served entity based on a result of the determining. In turn, in step S2-2, e.g. the served entity 201 may perform receiving the service provision-related information.

In an optional step S2-3, e.g. the served entity 201 may perform deciding on acceptance of the received service provision-related information based on at least one of a memory resource state of the served entity and a relationship of trust with the serving entity.

In step S2-4, e.g. the served entity 201 may perform holding the received service provision-related information. Alternatively, in an optional step S2-8*b*, e.g. the served entity 201 may perform transmitting of an error indication in response to the transmitted service provision-related information, which error indication may be received by the serving entity 202 in an optional step S1-6*b*

In an optional step S1-5, e.g. the serving entity 202 may perform deleting, after the transmitting, the unused portions. In an optional step S2-5, e.g. the served entity 201 may perform creating, at least for a portion of locators comprised in the list, new service-provision-related information. Further, in an optional step S2-6, e.g. the served entity 201 may perform resolving destination information (e.g. obtained from at least one previously visited serving entity (not shown)) in the list so as to obtain the service provision-related information.

Then, in an optional step S2-7, e.g. the served entity 201 may perform checking whether service provision-related information is present at the serving entity 202.

In step S2-8*a*, e.g. the served entity 201 may perform transmitting, from the served entity 201 to the serving entity 202, the service provision-related information. In turn, in an optional step S1-6a, e.g. the serving entity 202 may perform receiving, from the served entity 201, the service provision-related information.

In an optional step S1-7a, e.g. the serving entity 202 may perform deciding on acceptance of the received service provision-related information based on at least one of a policy and a state of the memory resource. Alternatively, in an optional step S1-7b, e.g. the serving entity 202 may perform resolving so as to obtain the service provision-related information.

In an optional step S2-9, e.g. the served entity 201 may perform setting, if a result of the checking in optional step S2-7 is affirmative, an inactive state of the service provision-related information so as to not transmit the service provision-related information (in the future), and, if a result of the checking is negative, an active state of the service provision-related information e.g. after the transmitting.

As for further developments of the method pertaining to the serving entity 202, the service provision-related information may be transmitted as at least a portion of an internet control message protocol message. Further, the service provision-related information may be transmitted to a plurality of served entities. In that case, the service provision-related information may also be transmitted using a mapping information multicast group.

As for further developments of the method pertaining to the served entity 201, the service-provision-related information may comprise the above-described list of previously used service provision-related information. In that case, the list may be obtained by provisioning from a dynamic host configuration protocol, an access, authorization, and accounting server or browser history information. As an alternative, the list may also be obtained from at least one previously visited serving entity.

Further, relating to the method pertaining to the served entity 201, the service provision-related information may be transmitted as at least a portion of another internet control message protocol message. In that case, if the state is set to active, the service provision-related information may not be transmitted to the serving entity unless another address configuration process is performed. Further, according to the above, the state may be set to inactive, if the service provision-related information is accepted (e.g. by the serving entity 201).

Further, relating to the method pertaining to the served entity 201, the transmitting may be performed prior to transmission of a first data packet pertaining to a service indicated by the service provision-related information. In addition, the transmitted service provision-related information may be encapsulated. Further, if the served entity is a mobile entity, the transmitting may be performed after a mobility event.

Finally, as for further developments of the methods pertaining to the served entity 201 and the serving entity 202, the mapping information may further comprise a time stamp. Further, any messaging between the serving entity 202 and the served entity 201 may be constituted by at least one extension to a context transfer protocol. Still further, any messaging between the serving entity 202 and the served entity 201 may be secured using secure neighbor discovery.

Figure 3:
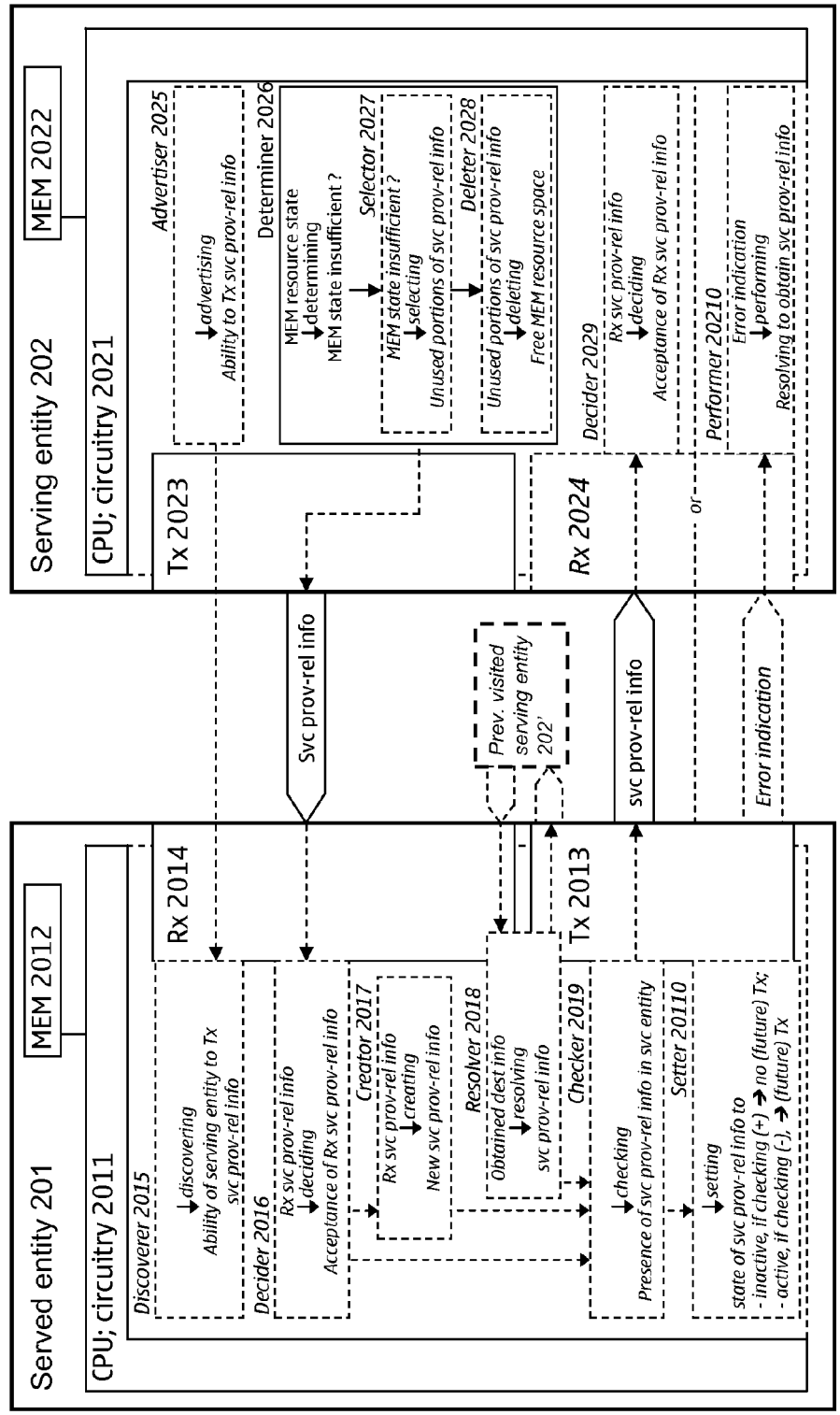
FIG. 3 shows apparatuses for distributed storage of service provision-related information according to the example of the present invention.
Figure 4:
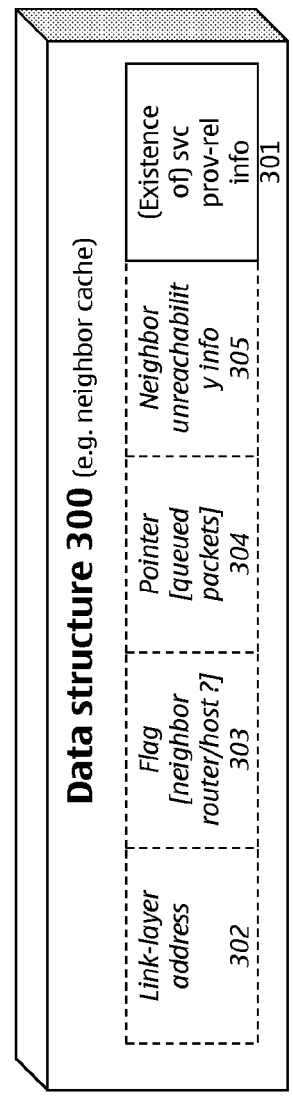
FIG. 4 shows a data structure for distributed storage of service provision-related information according to the example of the present invention.

FIG. 3 shows apparatuses (e.g. served entity 201 and serving entity 202) for distributed storage of service provision-related information according to the example of the present invention. Within FIG. 3, for ease of description, means or portions which may provide main functionalities are depicted with solid functional blocks or arrows and/or a normal font, while means or portions which may provide optional functions are depicted with dashed functional blocks or arrows and/or an italic font.

The served entity 201 may comprise a CPU (or circuitry) 2011, a memory 2012, a transmitter (or means for transmitting) 2013, a receiver (or means for receiving) 2014, an optional discoverer (or means for discovering) 2015, an optional decider (or means for deciding) 2016, an optional creator (or means for creating) 2017, an optional resolver (or means for resolving) 2018, an optional checker (or means for checking) 2019 and an optional setter (or means for setting) 20110.

The serving entity 202 may comprise a CPU (or circuitry) 2021, a memory (acting e.g. as means for holding) 2022, a transmitter (or means for transmitting) 2023, an optional receiver (or means for receiving) 2024, an optional advertiser (or means for advertising) 2025, a determiner (or means for determining) 2026, an optional selector (or means for selecting) 2027, an optional deleter (or means for deleting) 2028, an optional decider (or means for deciding) 2029 and an optional performer (or means for performing) 20210.

As indicated by the dashed extensions of the functional blocks of the CPU 2011 or 2021, the means for discovering 2015, the means for deciding 2016, the means for creating 2017, the means for resolving 2018, the means for checking 2019 and the means for setting 20110 of the served entity 201 as well as the means for advertising 2025, the means for determining 2026, the means for selecting 2027, the means for deleting 2028, the means for deciding 2029 and the means for performing 20210 of the serving entity 202 may be functionalities running on the CPU 2011 or 2021 of the served entity 201 and/or serving entity 202, or may alternatively be separate functional entities or means. The same applies to the means for holding 2022.

The CPUs 20x1 (wherein x=1 and/or 2) may respectively be configured, for example by software residing in the memory 20x2, to process various data inputs and to control the functions of the memories 20x2, the means for transmitting 20x3 and the means for receiving 20x4 (and the means for discovering 2015, the means for deciding 2016, the means for creating 2017, the means for resolving 2018, the means for checking 2019 and the means for setting 20110 of the served entity 201 as well as the means for advertising 2025, the means for determining 2026, the means for selecting 2027, the means for deleting 2028, the means for deciding 2029 and the means for performing 20210 of the serving entity 202). The memories 20x2 may serve e.g. for storing code means for carrying out e.g. the methods according to the example of the present invention, when run e.g. on the CPUs 20x1. It is to be noted that the means for transmitting 20x3 and the means for receiving 20x4 may alternatively be provided as respective integral transceivers. It is further to be noted that the transmitters/receivers may be implemented i) as physical transmitters/receivers for transceiving e.g. via the air interface (e.g. between the served entity 201 and the serving entity 202), ii) as routing entities e.g. for transmitting/receiving data packets e.g. in a PS (packet switching) network (e.g. between the serving entity 202 and another network element (not shown) when disposed as separate network entities), iii) as functionalities for writing/reading information into/from a given memory area (e.g. in case of shared/common CPUs or memories e.g. of the serving entity 202 and another network element (not shown) when disposed as an integral network entity), or iv) as any suitable combination of i) to iii).

Further, as shown in FIG. 3, optionally, e.g. the means for advertising 2025 of the serving entity 202 may perform advertising, e.g. to the served entity 201, a capability of transmitting service provision-related information required for service provision from the serving entity to a served entity. In turn, optionally, e.g. the means for discovering 2015 of the served entity 201 may perform discovering the ability that the serving entity is capable of transmitting the service provision-related information to the served entity.

For example, the means for determining 2026 of the serving entity 202 may perform determining if a memory resource of the serving entity is insufficient for storing the service provision-related information.

Further, optionally, e.g. the means for selecting 2027 of the means for determining 2026 may perform selecting of unused portions of the service provision-related information.

Then, e.g. the means for transmitting 2023 of the serving entity 202 may perform transmitting, after the determining performed by the means for determining 2026, the service provision-related information to the served entity based on a result of the determining. In turn, e.g. the means for receiving 2014 of the served entity 201 may perform receiving the service provision-related information.

Optionally, e.g. the means for deciding 2016 of the served entity 201 may perform deciding on acceptance of the received service provision-related information based on at least one of a memory resource state of the served entity and a relationship of trust with the serving entity.

Then, e.g. the means for holding 2022 of the serving entity 202 may perform holding the received service provision-related information. Alternatively, e.g. the means for transmitting 2013 of the served entity 201 may perform transmitting of an error indication in response to the transmitted service provision-related information, which error indication may be received by the means for receiving 2024 of the serving entity 202.

Optionally, e.g. the means for deleting 2028 of the serving entity 202 may perform deleting, after the transmitting performed by the means for transmitting 2023, the unused portions. Optionally, e.g. the means for creating 2017 of the served entity 201 may perform creating, at least for a portion of locators comprised in the list, new service-provision-related information. Further optionally, e.g. the means for resolving 2018 of the served entity 201 may perform resolving destination information (e.g. obtained from at least one previously visited serving entity 202') in the list so as to obtain the service provision-related information.

Then, optionally, e.g. the means for checking 2019 of the served entity 201 may perform checking whether service provision-related information is present at the serving entity 202.

For example, the means for transmitting 2013 of the served entity 201 may perform transmitting, from the served entity 201 to the serving entity 202, service provision-related information. In turn, optionally, e.g. the means for receiving 2024 of the serving entity 202 may perform receiving, from the served entity 201, the service provision-related information.

Optionally, e.g. the means for deciding 2029 of the serving entity 202 may perform deciding on acceptance of the received service provision-related information based on at least one of a policy and a state of the memory resource. Alternatively and optionally, e.g. the means for performing 20210 of the serving entity 202 may perform resolving so as to obtain the service provision-related information.

Optionally, e.g. the means for setting 20110 of the served entity 201 may perform setting, if a result of the checking performed by the means for checking 2019 is affirmative, an inactive state of the service provision-related information so as to not transmit the service provision-related information (in the future), and, if a result of the checking is negative, an active state of the service provision-related information e.g. after the transmitting.

As for further developments of the serving entity 202, the service provision-related information may be transmitted as at least a portion of an internet control message protocol message. Further, the service provision-related information may be transmitted to a plurality of served entities. In that case, the service provision-related information may also be transmitted using a mapping information multicast group.

As for further developments of the served entity 201, the service-provision-related information may comprise the above-described list of previously used service provision-related information. In that case, the list may be obtained by provisioning from a dynamic host configuration protocol, an access, authorization, and accounting server or browser history information. As an alternative, the list may also be obtained from at least one previously visited serving entity.

Further, relating to the served entity 201, the service provision-related information may be transmitted as at least a portion of another internet control message protocol message. In that case, if the state is set to active, the service provision-related information may not be transmitted to the serving entity unless another address configuration process is performed. Further, according to the above, the state may be set to inactive, if the service provision-related information is accepted (e.g. by the serving entity 201).

Further, relating to the served entity 201, the transmitting may be performed prior to transmission of a first data packet pertaining to a service indicated by the service provision-related information. In addition, the transmitted service provision-related information may be encapsulated. Further, if the served entity is a mobile entity, the transmitting may be performed after a mobility event.

Finally, as for further developments of the served entity 201 and the serving entity 202, the mapping information may further comprise a time stamp. Further, any messaging between the serving entity 202 and the served entity 201 may be constituted by at least one extension to a context transfer protocol. Still further, any messaging between the serving entity 202 and the served entity 201 may be secured using secure neighbor discovery.

Furthermore, at least one of, or more of the above-described means for holding 2022, means for discovering 2015, means for deciding 2016, 2029, means for creating 2017, means for resolving 2018, means for checking 2019, means for setting 20110, means for advertising 2025, means for determining 2026, means for selecting 2027, means for deleting 2028, means for performing 20210 as well as the served entity 201 and the serving entity 202, or the respective functionalities carried out, may be implemented as a chipset, module or subassembly.

Finally, the example of present invention also relates to a system which may comprise the served entity 201 and the serving entity 202 according to the above-described example of the present invention.

FIG. 3 shows a data structure 300 for distributed storage of service provision-related information according to the example of the present invention.

As shown in FIG. 3, the data structure 300 may comprise an information element 301 for storing, at a serving entity 202, an existence of service provision-related information and/or the service provision-related information required for service provision from the serving entity 202 to a served entity 201. Optionally, the data structure 300 may also comprise a link layer address 302, a flag 303 indicating whether a neighbor is a router or host, a pointer 304 for pointing to any packets queued in the serving entity 202 and neighbor unreachability information 305.

As a development, the data structure may be constituted by a neighbor cache data structure.

Without being restricted to the details following in this section, the examples of the present invention may be summarized as follows:

The main idea may reside in the following: Data may be required in a serving entity (or instance such as server, gateway etc.) for provision of a service to a served entity (or instance using the service, such as client, user etc.). The data which may need to be stored at least temporarily (e.g. in a cache) and may be removed and discarded from the cache according to certain criteria (e.g. age) if the allocated memory space is filled due to accumulation of that data, is not discarded (immediately), but is relayed, for further storage, to the entity (served entity) for which the data was (originally) required. From the served entity, the data may be delivered to the serving entity, upon request, when newly using the service and may be made available immediately. Thus, a cumbersome process for searching and providing the required data can be dispensed with.

Caches may have a limited size and a related so-called "house-keeping function" that clears unused or expired entries from the cache. Because of the limited memory size of the cache, the gateway may purge unused mapping information to free space for new active sessions, even if the mapping may be needed in the future. In case there is no mapping information available for a newly requested connection to a destination host located in a remote edge network, the gateway may need to resolve the mapping from an external mapping system.

The examples of the present invention may use a different context: saving otherwise lost cached mapping information of a gateway device to the clients in the edge address space, and in case of a new host joining the local network (e.g. because of host mobility) to update the gateway mapping cache with the mapping information stored in the host. The host attached to the edge address space may initiate a connection to the remote node, not to the gateway, even if the communication path passes through the gateway. State transfers of the mapping information may happen only when the gateway is dropping the state from its cache, when the host is joining the edge network, or when a new mapping is resolved.

When a gateway acting at the boundary between an edge address space and a transit address space runs out of cache memory for new entries, it may make room for mapping information entries by pushing the mapping information to the hosts that were using the mappings previously, and e.g. by purging the old or unused ones (e.g. based on the local cache management policy.

When a host that initiates a communication with an other host in a remote edge address space (this can be discovered for example as part of normal IPv6 Neighbor Discovery process, i.e. off link prefix) notices that the addressed destination has a matching mapping information for the destination pushed previously by the gateway the host forwards this information back to the gateway in order to quickly re-establish the mapping state. Now the gateway has re-learnt the mapping information and could reuse it in its cache without consulting any external mapping resolution system. After this the host can send the packet to the remote host without experiencing mapping resolution and jitter delay.

When a host, possibly a mobile host, enters into a new edge network it may offer to the gateway a list of its frequently used addresses with a mapping information it had learnt earlier from a previous gateway or gained otherwise (e.g. through provisioning, DCHP or AAA, or from an application). The gateway then either uses the offered mapping information or resolves the targets to get most recent mappings from the mapping system based on its local policies. The local policies may take into account the destination transit address (i.e. the locator and the related the routing topology) in the mapping information and the time stamp among others, before any new sessions are initiated by the newly joining host, e.g. for some transit addresses the new mapping would be created and for others the one that the host offered may be acceptable.

The implementation may require that

A host has information on existence of a gateway that connects between the edge address space and the transport address space, therefore there needs to be means to discover the gateway functionality.

The host may need to be able to maintain the mapping information it receives from the gateway. The mapping information is in an "active" state when in use by the gateway or in "inactive" when pushed by the gateway to the host and cleared from the cache of the gateway.

The host and the gateway must be able to change the mapping information. A protocol messaging may be needed for this purpose. For example, ICMP messages may be used.

The host may have policy rules whether to accept and how to use the mapping information received from the gateway.

The gateway may need to be able to reuse the mapping information received from the host and have policies for such reuse.

Exchange of the mapping information may be secured similarly to the message of neighbor discovery process.

In the following, an exemplary implementation of the use of mapping information exchange between the host and the gateway is described in more detail and protocols and their extensions are identified.

The gateway acting between the edge and transport address spaces can advertise its capabilities e.g. through router advertisements mechanisms. A flag for a gateway between edge and transport address spaces may be defined to denote the existence of the gateway functionality with a cache. Based on this flag, the hosts may have information on the existence of a gateway that may use mapping information exchange according to the examples of the present invention.

The host and the gateway that may be assumed, without any limitation to generality, to be the first hop router or default router of the host, may pass neighbor discovery procedures. After a successful address configuration, the host may check if it has preconfigured mapping information that it might have received from the previously visited gateways, or it may have been configured through other provisioning means, e.g. based on the history information of a browser etc. The existence of the mapping information may be included in the neighbor cache data structure of the neighbor discovery process, which data structure the host may check after successful address configuration and every time a packet is sent. If such mapping information exists in the data structure, the host may initialize the state of the mapping information to "inactive" after the successful address auto-configuration. This means that the mapping information have not been offered to the gateway. The host may choose, based on its local policies, to offer this information to the gateway e.g. by sending an ICMP message that is destined to the gateway that announced to be acting as a gateway between the two address spaces. The ICMP message may contain the mappings of destination edge address to the locator and/or (fully qualified domain names) FQDNs of the destinations if provisioned e.g. by an application. In the latter case, the gateway may resolve the FQDNs into locators and the edge addresses of the destinations. After sending the ICMP message to the gateway, the host may mark (or set) the mapping context information to be "activated" to mark that the host assumes that the gateway has the mapping information. If the mapping information is marked as "activated", it may not be resent to the same gateway unless the host is subjected e.g. to a new address configuration process. The gateway may or may not accept the mapping information from the host depending on its own policies and/or state of its cache.

When the gateway needs to clear room for new mappings in its cache, the gateway may locate unused entries e.g. based on its cache management scheme. But instead of immediately deleting the entries, the gateway may check, based on the mapping information, which host used the mapping most recently and may transmit the mapping information to that host before clearing the mapping information from the cache. The mapping information may be sent to the host e.g. in one or more ICMP messages. If the gateway is able to track more than one host per its mapping state information, it should transmit the mapping information to all of them. The possibility to use e.g. "mapping information multicast group" may also be used to distribute the mappings to multiple hosts, or to all of them.

The host may or may not accept any mapping information from a gateway e.g. if the host has or has not available capacity, if the host trusts or does not trust the gateway, or if the host is not capable of performing the example of the present invention. This may be a matter of local policy.

If a host accepts the mapping information from the gateway, the host may store the information e.g. into the neighbor cache extension according to the examples of the present invention and may mark (or set) the state of the information to "inactive". This means that the gateway does not have the mapping in its own cache. When a new packet is to be transmitted through the gateway, the host may (???) its neighbor cache, and in addition, may check if there are any "inactive" mappings for the remote edge address of the packet to be transmitted. If there are, the host may transmit firstly the mapping information ICMP message to the gateway and secondly the actual packet. The two messages may be encapsulated as well. The host may mark (or set) its own copy of the mapping information as "active", and may not transmit the mapping to the gateway afterwards. With the mapping information, the gateway restores the mapping state into its cache.

The information mapping exchange messaging between the host and the gateway may be implemented as an extension to a context transfer protocol. The ICMP message exchange of the mapping information may be secured.

In the case of mobile entity with existing mapping information, the mobile entity may choose to offer, to a new gateway after a mobility event (e.g. roaming or handover), its mapping information that could have been received from a previously visited gateway, or be configured through an application that is able to configure frequently used hosts.

For example, using the mapping information, one mapping entry may contain 32 bits during lifetime, locator mask length may be 32 bits, EID prefix may be 128 bits (assuming e.g. IPv6), for priority, weight and multicasting flags may be 32 bits, for locator (AFI), EID AFI may be 32 bits and for locator may be 128 bits, and more cache management may be some 128 bits. This may amount up to 512 bits. Assuming that for a host there may be around 8 active mappings, the total mapping information is of the order of 4096 bits (512 bytes).

Further Examples

For the purpose of the present invention as described herein above, it should be noted that the above-described networking scheme utilizing serving entity and served entity may be applicable to any client/server relationship;

a circuitry may refer to at least one of, or hybrids of the following:
  (a) to pure hardware circuit implementations (such as implementations purely in analog and/or digital circuitry), and
  (b) to combinations of circuits and software (and/or firmware), such as (as applicable):
    (i) a combination of processor(s), or
    (ii) portions of processor(s)/software (including digital signal processor(s)), software and memory (or memories) that work together to cause an apparatus as defined hereinabove to perform various functions, and
  (c) to circuits, such as (micro)processor(s) or a portion of
    (a) (micro)processor(s) that require software and/or firmware for operation even if the software or firmware is not physically present;

a processor may be any processing unit, such as CPU, arithmetic and logic unit (ALU), microprocessor unit (MPU), digital signal processor (DSP) etc., be it a single core processor, dual core processor or multi-core processor;

a program may be embodied by or on any computer program (product), computer readable medium, processor(s), memory (or memories), circuitry, circuits, random access memory (RAM), read-only memory (ROM) and/or data structure(s), be it e.g. as compiled/non-compiled program (source) code, executable object, (meta)file or the like;

an access technology may be any technology by means of which a user equipment can access an access network (or base station, respectively). Any present or future technology, such as WiMAX (Worldwide Interoperability for Microwave Access) or WLAN (Wireless Local area Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the internet protocol (IP). The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses, circuitries and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s)/circuitry(ies) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units, circuitries or means (e.g. the above-defined apparatuses, or any one of their respective means) can be implemented as individual devices, units or means, but this does not exclude that they are implemented in a distributed fashion throughout the system, as long as the functionality of the device, unit. circuitry or means is preserved;

an apparatus may be represented by a semiconductor chip, a chipset, a (hardware) module comprising such chip or chipset, or a circuitry; this, however, does not exclude the possibility that a functionality of an apparatus, module or circuitry, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

According to an example of the present invention, in a first aspect, this object is for example achieved by a method comprising:

determining, at a serving entity, if a memory resource of the serving entity is insufficient for storing service provision-related information required for service provision from the serving entity to a served entity; and transmitting, after the determining and from the serving entity, the service provision-related information to the served entity based on a result of the determining.

According to further refinements of the example of the present invention as defined under the above first aspect, the method further comprises receiving, from the served entity, the service provision-related information;

the method further comprises deciding acceptance of the received service provision-related information based on at least one of a policy and a state of the memory resource;

the method further comprises receiving an error indication in response to the transmitted service provision-related information;

the method further comprises performing resolving so as to obtain the service provision-related information;

the determining further comprises selecting unused portions of the service provision-related information, and defeting, after the transmitting, the unused portions;

the service provision-related information is transmitted as at least a portion of an internet control message protocol message;

the service provision-related information is transmitted to a plurality of served entities;

the service provision-related information is transmitted using a mapping information multicast group;

the method further comprises advertising a capability of transmitting the service provision-related information to the served entity.

According to an example of the present invention, in a second aspect, this object is for example achieved by a method comprising:

receiving, at a served entity, service provision-related information required for service provision from a serving entity to the served entity;

holding the received service provision-related information; and transmitting, from the served entity to the serving entity, the held service provision-related information.

According to further refinements of the example of the present invention as defined under the above second aspect, the service-provision-related information comprises a list of previously used service provision-related information;

the list is obtained by provisioning from one of a dynamic host configuration protocol, an access, authorization, and accounting server and browser history information;

the list is obtained from at least one previously visited serving entity;

the method further comprises resolving destination information in the list so as to obtain the service provision-related information;

the method further comprises creating, at least for a portion of locators comprised in the list, new service-provision-related information;

the method further comprises discovering an ability that the serving entity is capable of transmitting the service provision-related information to the served entity;

the service provision-related information is transmitted as at least a portion of an internet control message protocol message;

the method further comprises deciding acceptance of the received service provision-related information based on at least one of a memory resource state of the served entity and a relationship of trust with the serving entity;

the method further comprises checking whether service provision-related information is present at the serving entity, and setting, if a result of the checking is affirmative, an inactive state of the service provision-related information so as to not transmit the service provision-related information, and, if a result of checking is negative, an active state of the service provision-related information after the transmitting;

if the state is set to active, the service provision-related information is not transmitted to the serving entity unless another address configuration process is performed;

the state is set to inactive, if the service provision-related information is accepted;

the transmitting is performed prior to transmission of a first data packet pertaining to a service indicated by the service provision-related information;

the transmitted service provision-related information is encapsulated;

if the served entity is a mobile entity, the transmitting is performed after a mobility event.

According to further refinements of the example of the present invention as defined under the above first and second aspects, the service provision-related information is mapping information;

the mapping information is a definition of a mapping between an endpoint identifier and a locator;

the mapping information further comprises a time stamp;

messaging between serving entity and served entity is constituted by at least one extension to a context transfer protocol;

messaging between serving entity and served entity is secured using secure neighbor discovery;

the mobility event is one of a roaming operation and a handover operation.

According to an example of the present invention, in a third aspect, this object is for example achieved by an apparatus comprising:

means for determining, at a serving entity, if a memory resource of the serving entity is insufficient for storing service provision-related information required for service provision from the serving entity to a served entity; and means for transmitting, after the determining and from the serving entity, the service provision-related information to the served entity based on a result of the determining performed by the means for determining.

According to further refinements of the example of the present invention as defined under the above third aspect, the apparatus further comprises means for receiving, from the served entity, the service provision-related information;

the apparatus further comprises means for deciding acceptance of the received service provision-related information based on at least one of a policy and a state of the memory resource;

the apparatus further comprises means for receiving an error indication in response to the transmitted service provision-related information;

the apparatus further comprises means for performing resolving so as to obtain the service provision-related information;

the means for determining further comprises means for selecting unused portions of the service provision-related information, and means for deleting, after the transmitting, the unused portions;

the service provision-related information is transmitted as at least a portion of an internet control message protocol message;

the service provision-related information is transmitted to a plurality of served entities;

the service provision-related information is transmitted using a mapping information multicast group;

the apparatus further comprises means for advertising a capability of transmitting the service provision-related information to the served entity;

the apparatus is constituted by one of a serving entity and a gateway entity.

According to an example of the present invention, in a fourth aspect, this object is for example achieved by an apparatus comprising:

means for receiving, at a served entity, service provision-related information required for service provision from a serving entity to the served entity;

means for holding the received service provision-related information; and means for transmitting, from the served entity to the serving entity, the held service provision-related information.

According to further refinements of the example of the present invention as defined under the above fourth aspect, the service-provision-related information comprises a list of previously used service provision-related information;

the list is obtained by provisioning from one of a dynamic host configuration protocol, an access, authorization, and accounting server and browser history information;

the list is obtained from at least one previously visited serving entity;

the apparatus further comprises means for resolving destination information in the list so as to obtain the service provision-related information;

the apparatus further comprises means for creating, at least for a portion of locators comprised in the list, new service-provision-related information;

the apparatus further comprises means for discovering an ability that the serving entity is capable of transmitting the service provision-related information to the served entity;

the service provision-related information is transmitted as at least a portion of an internet control message protocol message;

the apparatus further comprises means for deciding acceptance of the received service provision-related information based on at least one of a memory resource state of the served entity and a relationship of trust with the serving entity;

the apparatus further comprises means for checking whether service provision-related information is present at the serving entity, and means for setting, if a result of the checking is affirmative, an inactive state of the service provision-related information so as to not transmit the service provision-related information, and, if a result of checking is negative, an active state of the service provision-related information after the transmitting performed by the means for transmitting;

if the state is set to active, the service provision-related information is not transmitted to the serving entity unless another address configuration process is performed;

the state is set to inactive, if the service provision-related information is accepted;

the means for transmitting is configured to transmit prior to transmission of a first data packet pertaining to a service indicated by the service provision-related information;

the transmitted service provision-related information is encapsulated;

if the served entity is a mobile entity, the means for transmitting is configured to transmit after a mobility event;

the apparatus is constituted by one of a client entity, a user equipment, a host entity and a mobile host entity.

According to further refinements of the example of the present invention as defined under the above third and fourth aspects, the service provision-related information is mapping information;

the mapping information is a definition of a mapping between an endpoint identifier and a locator;

the mapping information further comprises a time stamp;

messaging between serving entity and served entity is constituted by at least one extension to a context transfer protocol;

messaging between serving entity and served entity is secured using secure neighbor discovery;

the mobility event is one of a roaming operation and a handover operation;

at least one, or more of means for holding, means for determining, means for transmitting, means for deciding, means for selecting, means for deleting, means for advertising, means for receiving, means for resolving, means for creating, means for discovering, means for performing, means for checking, means for setting and the apparatus is implemented as a chipset, module or subassembly.

According to an example of the present invention, in a fifth aspect, this object is for example achieved by an apparatus comprising:

a determiner configured to determine, at a serving entity, if a memory resource of the serving entity is insufficient for storing service provision-related information required for service provision from the serving entity to a served entity; and a transmitter configured to transmit, after the determining and from the serving entity, the service provision-related information to the served entity based on a result of the determining performed by the determiner.

According to further refinements of the example of the present invention as defined under the above fifth aspect, the apparatus further comprises a receiver configured to receive, from the served entity, the service provision-related information;

the apparatus further comprises a decider configured to decide acceptance of the received service provision-related information based on at least one of a policy and a state of the memory resource;

the apparatus further comprises a receiver configured to receive an error indication in response to the transmitted service provision-related information;

the apparatus further comprises a performer configured to perform resolving so as to obtain the service provision-related information;

the determiner further comprises a selector configured to select unused portions of the service provision-related information, and a deleter configured to delete, after the transmitting, the unused portions;

the service provision-related information is transmitted as at least a portion of an internet control message protocol message;

the service provision-related information is transmitted to a plurality of served entities;

the service provision-related information is transmitted using a mapping information multicast group;

the apparatus further comprises an advertiser configured to advertise a capability of transmitting the service provision-related information to the served entity;

the apparatus is constituted by one of a serving entity and a gateway entity.

According to an example of the present invention, in a sixth aspect, this object is for example achieved by an apparatus comprising:

a receiver configured to receive, at a served entity, service provision-related information required for service provision from a serving entity to the served entity;

a holder configured to hold the received service provision-related information; and a transmitter configured to transmit, from the served entity to the serving entity, the held service provision-related information.

According to further refinements of the example of the present invention as defined under the above sixth aspect, the service-provision-related information comprises a list of previously used service provision-related information;

the list is obtained by provisioning from one of a dynamic host configuration protocol, an access, authorization, and accounting server and browser history information;

the list is obtained from at least one previously visited serving entity;

the apparatus further comprises a resolver configured to resolve destination information in the list so as to obtain the service provision-related information;

the apparatus further comprises a creator configured to create, at least for a portion of locators comprised in the list, new service-provision-related information;

the apparatus further comprises a discoverer configured to discover an ability that the serving entity is capable of transmitting the service provision-related information to the served entity;

the service provision-related information is transmitted as at least a portion of an internet control message protocol message;

the apparatus further comprises a decider configured to decide acceptance of the received service provision-related information based on at least one of a memory resource state of the served entity and a relationship of trust with the serving entity;

the apparatus further comprises a checker configured to check whether service provision-related information is present at the serving entity, and a setter configured to set, if a result of the checking is affirmative, an inactive state of the service provision-related information so as to not transmit the service provision-related information, and, if a result of checking is negative, an active state of the service provision-related information after the transmitting performed by the transmitter;

if the state is set to active, the service provision-related information is not transmitted to the serving entity unless another address configuration process is performed;

the state is set to inactive, if the service provision-related information is accepted;

the transmitter is configured to transmit prior to transmission of a first data packet pertaining to a service indicated by the service provision-related information;

the transmitted service provision-related information is encapsulated;

if the served entity is a mobile entity, the transmitter is configured to transmit after a mobility event;

the apparatus is constituted by one of a client entity, a user equipment, a host entity and a mobile host entity.

According to further refinements of the example of the present invention as defined under the above fifth and sixth aspects, the service provision-related information is mapping information;

the mapping information is a definition of a mapping between an endpoint identifier and a locator;

the mapping information further comprises a time stamp;

messaging between serving entity and served entity is constituted by at least one extension to a context transfer protocol;

messaging between serving entity and served entity is secured using secure neighbor discovery;

the mobility event is one of a roaming operation and a handover operation;

at least one, or more of a holder, a determiner, a transmitter, a decider, a selector, a deleter, an advertiser, a receiver, a resolver, a creator, a discoverer, a performer, a checker, a setter and the apparatus is implemented as a chipset, module or subassembly.

According to an example of the present invention, in a seventh aspect, this object is for example achieved by a system comprising:

an apparatus according to the above third or fifth aspects; and an apparatus according to the above fourth or sixth aspects.

According to an example of the present invention, in an eighth aspect, this object is for example achieved by a computer program product comprising code means for performing a method according to the above first and second aspects when run on a processing means or module.

According to an example of the present invention, in a ninth aspect, this object is for example achieved by a computer program comprising code means configured to perform:

determining, at a serving entity, if a memory resource of the serving entity is insufficient for storing service provision-related information required for service provision from the serving entity to a served entity; and transmitting, after the determining and from the serving entity, the service provision-related information to the served entity based on a result of the determining.

According to an example of the present invention, in a tenth aspect, this object is for example achieved by a computer program comprising code means configured to perform:

receiving, at a served entity, service provision-related information required for service provision from a serving entity to the served entity;

holding the received service provision-related information; and transmitting, from the served entity to the serving entity, the held service provision-related information.

According to an example of the present invention, in an eleventh aspect, this object is for example achieved by a data structure comprising:

an information element for storing, at a serving entity, an existence of service provision-related information and/or the service provision-related information required for service provision from the serving entity to a served entity.

According to further refinements of the example of the present invention as defined under the above eleventh aspect, the data structure is constituted by a neighbor cache data structure.

Although the present invention has been described herein before with reference to particular embodiments thereof, the present invention is not limited thereto and various modification can be made thereto.

Definitions

FQDN Fully Qualifying Domain Name

EID Endpoint ID such as a 32-or 128-bit value used in the source and destination address fields of a packet. The host may obtain a destination EID the same way it obtains a destination address, for example through a DNS lookup or session initiation protocol (SIP) exchange. The source EID may be obtained via mechanisms used to set a host's "local" IP address. An EID block assigned to a site may have site-local structure (e.g. sub-netting) for routing within the site; this structure may not be visible to the global routing system.

ETR Egress Tunnel Router e.g. in locator/ID separation protocol (LISP) that may decapsulate packets tunneled by the ITR and may forward them to the intended host in the edge network that it is connected to. ETR may be also announced to the mapping resolution system the EID-routing locator (EID-RLOC) mappings of the hosts connected to their edge network.

RLOC Routing Locator may be the IP version 4 (IPv4) or IPv6 address of an egress tunnel router (ETR). It may be the output of an EID-to-RLOC mapping lookup. An EID may map to one or more RLOCs. RLOCs may be numbered from topologically-aggregatable blocks that are assigned to a site at each point to which it attaches to the global Internet; where the topology is defined by the connectivity of provider networks, RLOCs can be thought of as provider aggregatable (PA) addresses.

ITR Igress Tunnel Router e.g. in LISP that may act as a router to packets destined to hosts in the remote edge address space. ITR may resolve the EID-RLOC mapping of the remote host and may tunnel the packets to the corresponding ETR.

ICMP Internet Control Message Protocol e.g. for IPv6

The invention claimed is:

1. A method for distributed storage of service provision related information, which comprises:

determining, at a serving entity, whether or not a memory resource of the serving entity is insufficient for storing service provision-related information required for service provision from the serving entity to at least one of a plurality of served entities;

selecting old or unused service provision related information stored in the memory resource; and transmitting, from the serving entity, the selected service provision-related information to one of the plurality of served entities previously using said selected service provision related information.

2. The method according to claim 1, which further comprises receiving the service provision-related information from the served entity.

3. The method according to claim 2, which further comprises deciding whether or not to accept the received service provision-related information based on at least one of a policy or a state of the memory resource.

4. The method according to claim 1, wherein the determining step further comprises:

after the transmitting step, deleting the unused portions.

5. The method according to claim 1, wherein at least one of the following applies:

the service provision-related information is mapping information;

the mapping information is a definition of a mapping between an endpoint identifier and a locator;

the mapping information further includes a time stamp;

messaging between the serving entity and a served entity is constituted by at least one extension to a context transfer protocol;

messaging between the serving entity and a served entity is secured using secure neighbor discovery; and a mobility event is one of a roaming operation and a handover operation.

6. The method according to claim 1, further comprising the steps of:
- receiving, at the served entity, the service provision-related information required for service provision from the serving entity to the served entity;
- holding the received service provision-related information; and
- transmitting, from the served entity to the serving entity, the held service provision-related information.

7. The method according to claim 6, wherein the service-provision-related information comprises a list of previously used service provision-related information.

8. The method according to claim 7, which comprises obtaining the list by provisioning from one of a dynamic host configuration protocol, an access, authorization, and accounting server and browser history information.

9. The method according to claim 7, which comprises obtaining the list from at least one previously visited serving entity.

10. The method according to claim 9, which further comprises resolving destination information in the list so as to obtain the service provision-related information.

11. The method according to claim 6, which further comprises:
- checking whether service provision-related information is present at the serving entity; and
- if a result of the checking step is affirmative, setting an inactive state of the service provision-related information so as not to transmit the service provision-related information; and
- if the result of the checking step is negative, setting an active state of the service provision-related information after the transmitting step.

12. The method according to claim 6, which comprises performing the transmitting step prior to a transmission of a first data packet pertaining to a service indicated by the service provision-related information.

13. The method according to claim 6, wherein at least one of the following applies:
- the service provision-related information is mapping information;
- the mapping information is a definition of a mapping between an endpoint identifier and a locator;
- the mapping information further includes a time stamp;
- messaging between the serving entity and a served entity is constituted by at least one extension to a context transfer protocol;
- messaging between the serving entity and a served entity is secured using secure neighbor discovery; and
- a mobility event is one of a roaming operation and a handover operation.

14. An apparatus for distributed storage of service provision related information, comprising:
- means for determining whether or not a memory resource of the serving entity is insufficient for storing service provision-related information required for service provision from the serving entity to at least one of a plurality of served entities;
- means for selecting old or unused service provision related information stored in the memory resource; and
- means for transmitting the selected service provision-related information from the serving entity to the served entity previously using said selected service provision related information.

15. The apparatus according to claim 14, further comprising means for receiving, from the served entity, the service provision-related information.

16. The apparatus according to claim 15, further comprising means for deciding acceptance of the received service provision-related information based on at least one of a policy or a state of the memory resource.

17. The apparatus according to claim 14, wherein said determining means further comprises:
- means for deleting, after a transmission of the service provision-related information, the unused portions.

18. An apparatus for distributed storage of service provision related information, comprising:
- means for receiving, at at least one of a plurality of served entities, service provision-related information required for service provision from a serving entity to the served entity;
- means for holding the received service provision-related information;
- means for transmitting, from the served entity to the serving entity, the held service provision-related information; and
- in response to a selection of old or unused service provision related information stored in a memory resource of the serving entity, receiving the selected service provision related information at at least one served entity that previously used it.

19. The apparatus according to claim 18, wherein the service-provision-related information comprises a list of previously used service provision-related information.

20. The apparatus according to claim 19, wherein the list is obtained by provisioning from one of a dynamic host configuration protocol, an access, authorization, and accounting server and browser history information.

21. The apparatus according to claim 19, further comprising means for resolving destination information in the list so as to obtain the service provision-related information.

22. The apparatus according to claim 18, further comprising:
- means for checking whether service provision-related information is present at the serving entity; and
- means for setting, if a result of the checking is affirmative, an inactive state of the service provision-related information so as not to transmit the service provision-related information, and, if the result of the checking is negative, an active state of the service provision-related information after the transmitting performed by the transmitting means.

23. The apparatus according to claim 18, wherein the transmitting means is configured to transmit prior to transmission of a first data packet pertaining to a service indicated by the service provision-related information.

24. The apparatus according to claim 18, wherein at least one of the following applies:
- the service provision-related information is mapping information;
- the mapping information is a definition of a mapping between an endpoint identifier and a locator;
- the mapping information includes a time stamp;
- messaging between the serving entity and the served entity is constituted by at least one extension to a context transfer protocol;
- messaging between the serving entity and the served entity is secured using secure neighbor discovery; and
- the mobility event is one of a roaming operation or a handover operation.

25. The apparatus according to claim 14, implemented in a serving entity or a gateway entity.

26. The apparatus according to claim 18, implemented in a client entity, a user equipment, a host entity, or a mobile host entity.

27. A computer program product, comprising computer-executable code stored in non-transitory form and configured to perform the method according to claim 1 when read in and executed on a processor.

28. A computer program product, comprising computer-executable code stored in non-transitory form and configured to perform the method according to claim 6 when read in and executed on a processor.

* * * * *